United States Patent [19]
Gee et al.

[11] Patent Number: 5,589,442
[45] Date of Patent: Dec. 31, 1996

[54] DRILLING FLUIDS COMPRISING MOSTLY LINEAR OLEFINS

[75] Inventors: Jeffrey C. Gee; Christophe J. Lawrie; Roger C. Williamson, all of Kingwood, Tex.

[73] Assignee: Chevron Chemical Company, San Ramon, Calif.

[21] Appl. No.: 480,986

[22] Filed: Jun. 7, 1995

Related U.S. Application Data

[63] Continuation of Ser. No. 190,405, Feb. 2, 1994.

[51] Int. Cl.$^6$ .................................................. C09K 7/02
[52] U.S. Cl. .................................................. 507/103; 507/905
[58] Field of Search .................................... 507/103, 905; 585/664, 665, 666, 667, 668, 669, 670

[56] References Cited

U.S. PATENT DOCUMENTS

| | | | |
|---|---|---|---|
| H1,000 | 12/1991 | Patel et al. ............................ | 507/103 |
| 4,108,889 | 8/1978 | Connor ................................. | 260/502.4 |
| 4,404,109 | 9/1983 | Tellier et al. ....................... | 252/8.55 D |
| 4,587,374 | 5/1986 | Peters .................................. | 585/670 |
| 4,996,366 | 2/1991 | Tinucci et al. ....................... | 568/454 |
| 5,045,219 | 9/1991 | Trahan et al. ....................... | 507/103 |
| 5,107,050 | 4/1992 | Gaffney et al. ..................... | 585/671 |
| 5,432,152 | 7/1995 | Dawson et al. ...................... | 507/103 |

FOREIGN PATENT DOCUMENTS

| | | | |
|---|---|---|---|
| 0652272 | 5/1995 | European Pat. Off. ........ | C09K 7/06 |
| 1055750 | 11/1983 | U.S.S.R. ........................ | C09K 7/06 |

OTHER PUBLICATIONS

"The Ultidrill* System", Part of a Schlumberger Dowell Publication, (1994).

*Primary Examiner*—Philip Tucker
*Attorney, Agent, or Firm*—M. H. Michel; W. Priester

[57] ABSTRACT

The present invention relates to synthetic hydrocarbon as the continuous phase of a drilling fluid. These hydrocarbons comprise mostly linear olefins, preferably $C_{14}$ to $C_{18}$ olefins.

18 Claims, 1 Drawing Sheet

DRILLING FLUIDS COMPRISING MOSTLY LINEAR OLEFINS

BACKGROUND OF THE INVENTION

This is a continuation of application Ser. No. 08/190,405, filed Feb. 2, 1994 now pending.

This invention relates to drilling fluids used in the drilling of subterranean oil and gas wells as well as other drilling fluid applications and drilling procedures. The invention is particularly concerned with synthetic hydrocarbons, and especially hydrocarbon mixtures containing mostly linear olefins, preferably with carbon numbers between 14 and 18. These synthetic hydrocarbons exhibit minimal toxicity toward aquatic life and possess desirable rheological and filtration control properties for use in drilling fluids.

The use of synthetic hydrocarbons, particularly oligomerized olefins, for drilling fluids has recently been patented. For example, Mercer et al. in U.S. Pat. No. 5,096,883 disclose the use of compositions consisting essentially of branched paraffins having between 16 and 40 atoms per molecule (such as the hydrogenated dimer of 1-decene) for this use. Also, Patel et al. in U.S. Pat. No. 5,189,012 disclose the use of compositions comprising branched chain oligomers having an average molecular weight of from 120 to 1000 in drilling fluids. These synthetic hydrocarbons are prepared by oligomerizing one or more olefinic monomers having a chain length of $C_2$ to $C_{14}$. The full disclosure of these two references is incorporated herein by reference.

One well-known method for oligomerizing olefins utilizes a boron trifluoride catalyst. However, boron trifluoride is toxic and, upon contact with water or steam, produces toxic and corrosive fumes. Moreover, disposal of boron trifluoride residues presents an environmental problem.

Therefore, a novel process to produce synthetic hydrocarbons useful for drilling fluids from non-hazardous reagents utilizing a non-hazardous, non-polluting catalyst would be a significant improvement in the art.

Additionally, only a small fraction of the commercially available products of olefin oligomerization are useful in drilling fluids. Thus, the synthetic hydrocarbons used in the above-mentioned patents are often in short supply and so are not always readily available.

The long-felt need described in these patents for an environmentally acceptable, fully functional, and readily available synthetic hydrocarbon for use in synthetic hydrocarbon-based drilling fluids has not yet been satisfied; that is, not until the invention described hereinbelow.

SUMMARY OF THE INVENTION

In one embodiment, the present invention is a continuous phase for a synthetic hydrocarbon-based drilling fluid comprising mostly linear olefins, where the olefins have at least 12 carbon atoms. An especially preferred composition has olefins containing between 14 and 18 carbon atoms.

In another embodiment, the present invention is an invert emulsion drilling fluid which includes a mixture of mostly linear olefins as the continuous phase, a weight material, and water. Optionally, the drilling fluid can contain emulsifiers, viscosifiers, fluid-loss additives, and other specific additives designed to impart desirable properties to the fluid.

Among other factors, the present invention is based on the unexpected discovery that, although normal alpha-olefins (NAO) are not generally useful in synthetic hydrocarbon-based drilling fluids, mixtures of mostly linear olefins are minimally toxic and highly effective as the continuous phase of drilling fluids.

BRIEF DESCRIPTION OF THE DRAWING

The figure is a ternary diagram showing compositional mixtures, in terms of weight percent, for $C_{14}$ NAO and isomerized normal alpha-olefins having sixteen and eighteen carbon atoms. The shaded area shows compositions of this invention.

DETAILED DESCRIPTION OF THE INVENTION

Figure 1:
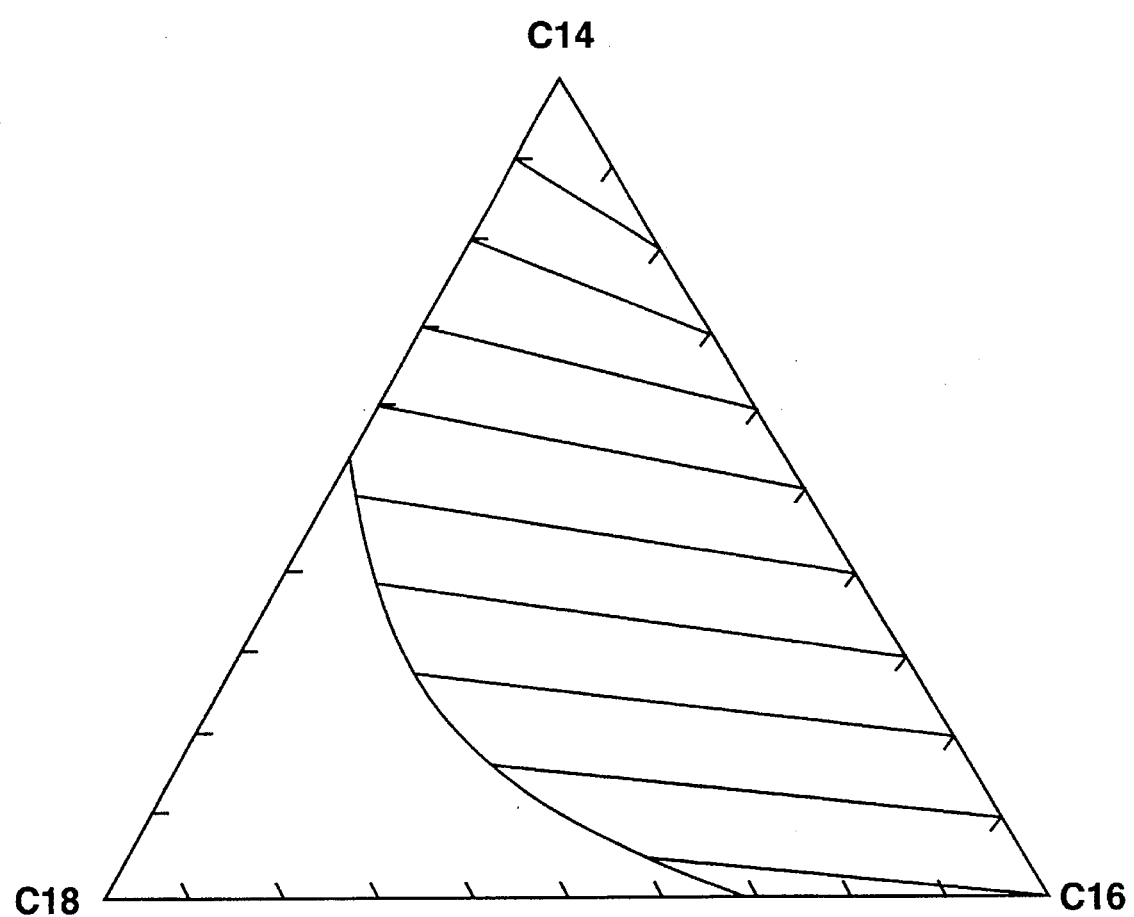

A mixture of "mostly linear" olefins, according to the present invention, is a mixture of olefins in which the majority of olefins are linear olefins, i.e., non-branched olefins. Such mixtures may even, but not necessarily, consist wholly of linear olefins. Linear or normal olefins for the purposes of this invention are straight chain, non-branched hydrocarbons with at least one double carbon-carbon bond present in the chain.

Preferred mixtures are those comprising mostly linear olefins with 12 or more carbons. Preferably, the linear olefin will contain between 12 and 24 carbon atoms, more preferably between 14 and 18 carbon atoms. Both odd and even number olefins can be used. One useful composition is prepared by double-bond isomerization of one or more NAO's having between 14 and 18 carbon atoms. In the mixtures of this invention, the majority of olefins are linear i.e., the mixtures are "mostly linear" or predominately linear. The term mostly linear as used herein means that between 50 and 100%, preferably between 60 and 100%, and more preferably between 70 and 80% of the olefins in the mixture do not have branch points along the hydrocarbon chain. On the other hand, it is further preferred that such mixtures also contain olefins with some side-chain branching. It is preferred that the branched olefins comprise at least 5%, preferably at least 10% of the mixture. Preferably, these mixtures are substantially free of aromatics. The special benefits of such mixtures will be described below.

Commercially available linear olefins, such as normal alpha olefins with 14 to 18 carbon atoms or more, have many of the desired properties of synthetic hydrocarbons useful as the continuous phase of a synthetic hydrocarbon-based drilling fluid including kinematic viscosity, flash point, and sheen properties. Unfortunately, the pour points of such materials are typically too high. However, we have found that mixtures of mostly linear olefins containing substantial amounts of internal olefins and small amounts of branched olefins, are useful in drilling fluids. Such mixtures can include, but are not limited to, mixtures containing $C_{14}$, $C_{16}$, or $C_{18}$ normal alpha- and linear internal olefins, or combinations thereof.

There are several ways to make compositions of this invention. For example, the mixture of olefins can be made by blending a number of commercially available olefins (i.e., linear alpha, linear internal, branched alpha and branched internal). For example a mixture of $C_{14}$ to $C_{18}$ linear internal olefins can be blended.

The linear olefins useful in this invention can be made in various ways, which are well known to those skilled in the art. These methods include, but are not limited to: cracking of linear paraffins; metathesis or disproportionation of olefins, especially alpha-olefins; oligomerization of ethylene; dehydrogenation of linear paraffins; and double bond isomerization of normal alpha-olefins.

One preferred preparation method involves catalytic olefin isomerization with or without skeletal isomerization. For instance, a platinum supported on a SAPO-11 molecular sieve catalyst can be used to partially isomerize a feed containing $C_{14}$ to $C_{18}$ olefins. This and related catalysts are described in U.S. Pat. No. 5,082,986. Other useful catalysts are well known in the art.

For platinum on SAPO-11 catalysts, partial isomerization is preferred. Therefore, preferred operating conditions include weight hourly space velocities (WHSV's) between 0.5 and 10 at temperatures between 120° and 220° C. More preferred conditions include WHSV's of between 0.5–5 at temperatures of 120°–160° C.; most preferred conditions include WHSV's of between 0.5–3.5 at temperatures of about 120°–140° C. Lower temperatures result in substantial olefin double bond migration, while higher temperatures result in increased skeletal rearrangement. The process is preferably conducted in the absence of added hydrogen.

The feed is preferably a mixture of linear olefins, preferably containing or consisting essentially of normal alpha-olefins. The feed can contain components of only one carbon number, or it can contain components of two or more different carbon numbers. Generally, each component has at least 12 carbon atoms; preferably between 12 and 24 carbon atoms, most preferably between 14 and 18 carbon atoms.

One preferred product is a mixture of linear and branched olefins; it may comprise products derived from a single olefin, or it may comprise a blend of products derived from a number of different olefins. The resulting mixture of mostly linear olefins is predominately internal olefins, typically having less than 20% alpha-olefin. About 10 to 45% of the product is branched rather than linear; typically the product is 20 to 40% branched.

Although discussed herein in terms of olefinic products, the product hydrocarbons of this invention can be hydrogenated to achieve complete or preferably partial saturation. These hydrogenated products are also intended to be encompassed by the term "olefins" as used herein. However, the unhydrogenated hydrocarbons are preferred.

The present inventors have demonstrated that drilling fluid formulations containing mixtures comprising mostly $C_{14}$ normal alpha-olefins are functional. However, the amount of $C_{13}$ and lower normal alpha-olefins that can be used is limited by undesirable flash point properties and the amount of $C_{15}$ and higher normal alpha-olefins limited by undesirable pour point properties. Depending on the composition of the various components, in some cases $C_{14}$ NAO can be blended with isomerized $C_{16}$ and/or isomerized $C_{18}$ product to produce mixtures having useful properties for drilling fluids.

The pour points of linear internal olefins are lower than those of the corresponding normal alpha-olefins. And, we have found that the former are especially useful in drilling fluids.

The present inventors have determined that mixtures comprising mostly linear internal olefins and additionally containing single branched olefins are particularly advantageous, in part because of the low pour points of such mixtures. A preferred product of the current invention has a pour point of less than −5° C. and will remain liquid and homogeneous after standing at −5° C. for at least one week. The viscosity of the product mixture at 100° C. will preferably be 1.3–1.7 cSt.

Based on the description above, a phase diagram showing acceptable products for the continuous phase of a drilling fluid can be constructed. The figure is an example of one such diagram. It shows regions of acceptable (shaded) and unacceptable blends of 1-tetradecene with $C_{16}/C_{18}$ mixtures. This figure was developed using a $C_{16}/C_{18}$ mixture having about 22% branched products (primarily methyl branched), about 10% normal alpha-olefin and about 68% linear internal olefins. The $C_{16}/C_{18}$ components for this figure were prepared by individually isomerizing a $C_{16}$ and a $C_{18}$ NAO at 180° C. at a WHSV of 1.6. For this figure, acceptable blends were defined as those that remained essentially clear and homogeneous after standing for two days at −10° C.

Mostly Linear Olefins in Drilling Fluids

One embodiment of the present invention is the use of mixtures of mostly linear olefins as the synthetic hydrocarbon in the continuous phase of invert, or water-in-oil, emulsion type drilling fluids. In another embodiment, this invention is a synthetic hydrocarbon-based drilling fluid containing primarily, i.e. greater than 80% and preferably greater than 90%, linear olefins.

Synthetic hydrocarbons used in downhole drilling fluids, especially offshore, must have at least five properties. These are low pour point, low viscosity, acceptable flash point, lack of sheen, and minimal toxicity. Preferred products of this invention have all these properties.

More particularly, the synthetic hydrocarbons preferably have a pour point below about 0° C. In offshore drilling, the drilling fluid may see the ambient ocean temperature in the riser, the section of pipe between the seabed and the drilling platform that is exposed to the ocean. Such temperatures can be close to 0° C. in the North Sea, for example, and the use of a synthetic hydrocarbon with a pour point higher than 0° C. may result in an unacceptable rise in the drilling fluid's viscosity, or even in severe thickening of the drilling fluid. Such phenomena can result in the drilling fluid's dispersing in the underground rock strata. More preferably, the synthetic hydrocarbon has a pour point below about −5° C. and remains homogenous after standing at −5° C. for at least one week. Most preferably the pour point is below about −9° C.

The derived kinematic viscosity of the drilling fluid is an important parameter since if it is too low, the drilling fluid will not perform its function of suspending the cuttings and bringing them to the surface; however, if it is too high, pumping of the drilling fluid will not be facile. While the derived kinematic viscosity of the drilling fluid can be controlled by additives, the viscosity of the synthetic hydrocarbon is a primary factor. For that reason, the kinematic viscosity of the synthetic hydrocarbon should be, broadly, in the range of 0.5 to 5 centistokes (cSt) at 100° C. More preferably, the kinematic viscosity at 100° C. is between 1 to 3 cSt, and, most preferably, is between 1.3 to 1.7 cSt.

A further requirement for the synthetic hydrocarbon is that it has a relatively high flash point for safety reasons. Preferably, the flash point should be above 90° C. A flash point above 110° C. is more preferred.

An additional requirement for the synthetic hydrocarbon is that it not produce a sheen when added to water. Unlike diesel fuels and other oils previously used in drilling fluid, the synthetic hydrocarbons of this invention produce no sheen and thus fulfill this requirement.

Additionally, the synthetic hydrocarbons of this invention are minimally toxic to marine and animal life. As invert emulsion drilling fluids, they exhibit minimal toxicity as determined by a mysid shrimp (*Mysidopsis bahia*) bioassay specified by the United States Environmental Protection Agency (EPA). As shown in the examples herein below, drilling fluids prepared using the synthetic hydrocarbons of this invention are environmentally compatible.

The drilling fluid compositions of the present invention can be modified according to the end use of the fluid using suitable weight materials, emulsifiers, wetting agents, viscosifiers, densifiers, fluid-loss additives, and the like. The fluids can also be used as workover fluids, packer fluids, coring fluids, completion fluids, and in other well-servicing applications.

The drilling fluid comprises a mixture of mostly linear olefins and optionally methyl-substituted olefins as the synthetic hydrocarbon or nonaqueous continuous phase. The synthetic hydrocarbon may comprise up to 100% by volume of the drilling fluid composition. Preferably, water is added as part of the composition and the aqueous phase may comprise up to 70% by volume of the composition.

Thus, the hydrocarbon preferably comprises at least 30% by volume of the drilling fluid, more preferably between about 50 to 70 volume percent. The aqueous phase may be either fresh water or aqueous solutions containing salts such as sodium chloride, potassium chloride, calcium chloride, and combinations thereof. The salts function as a densifier and emulsion stabilizer, and also serve to protect salt formations from dissolution in the drilling fluid.

If the drilling fluid is formulated with a significant water content, the aqueous phase is preferably dispersed within the nonaqueous phase to form an invert emulsion. In the absence of mechanical agitation, such emulsions are generally unstable; so anionic surfactants are commonly added. Hydrocarbon soluble anionic surfactants are preferred for stabilizing invert emulsions. Useful examples of such surfactants are the di- and trivalent metal salts of fatty acids; other useful surfactants are well known to those skilled in the art. The invert emulsion can be further stabilized by adding macromolecular surfactants. These include the polyamide class of emulsifiers manufactured by the reaction of polyamines with the combination of fatty acids and dibasic acids such as maleic and fumaric acids.

The density of the drilling fluid of the present invention can be adjusted by adding a weight material. It is often desirable to increase the drilling fluid density to prevent collapse of the formation into the bore-hole. Weight materials are well known in the art and include, but are not limited to: barium sulfate, calcium carbonate, iron oxide, and the like. To avoid the weight material settling out of high density drilling fluid compositions, it is often desirable to add a wetting agent. The emulsion stabilizing surfactants described above will serve this function also; however, other wetting agents can be added, if desired. These can include polyethoxylated alkylphenols, polyethoxylated alcohols, or polyethoxylated polyol fatty acid esters.

The suspending properties of the drilling fluid can be improved by adding a gellant or viscosifier. A commonly used viscosifier is an amine-treated clay. The clay will also impart some desirable filtration control properties. If further fluid loss control is desired, other additives such as organophilic lignites, blown asphalt, uintaite or other polymeric materials that will line the bore-hole can be used.

Other hydrocarbons, such as those described in U.S. Pat. No. 5,096,883 and/or U.S. Pat. No. 5,189,012, may be blended with the synthetic hydrocarbons of this invention provided that the final blend has the necessary pour point, kinematic viscosity, flash point, and toxicity properties to function as the continuous phase of a synthetic hydrocarbon-based drilling fluid. Additionally, the compositions may be modified by including various additives, such as those discussed above, to impart desirable properties to the drilling fluid. However, the omission of other specific additives in the discussion above is not intended to preclude their use in the drilling fluid of this invention.

The mostly linear olefins of this invention can be blended with other synthetic hydrocarbons, especially olefins, either branched or linear and preferably branched, in any proportion so long as the hydrocarbon meets the performance characteristics of a drilling fluid. An especially preferred blending agent is a polyalpha-olefin (PAO), especially PAO's having between 16 and 24 carbon atoms.

Preferred drilling fluids of this invention have performance properties equivalent to or better than conventional oil-based drilling fluids. The synthetic hydrocarbon of this invention can be used to prepare an invert emulsion with excellent high temperature stability. Indeed, the drilling fluid of this invention exhibited better high temperature stability when compared to a drilling fluid prepared from a commercial 2 cSt polyalpha-olefin synthetic hydrocarbon. Additionally, functional suspending properties of the products are indicated by the high yield points and acceptable gel strengths. Moreover, the fluid loss properties are good, even in the absence of a fluid loss additive.

Conventional oil-based drilling fluids exhibit substantial toxicity to marine life and therefore the cuttings from drilling operations with such fluids cannot currently be disposed of offshore, necessitating costly transport to shore and disposal in onshore hazardous waste facilities. In contrast, the drilling fluid of this invention exhibits minimal toxicity to marine life, as evidenced by the excellent survival rates of mysid shrimp exposed to the drilling fluid in bioassays conducted according to the Protocol specified by the US EPA.

Moreover, the derived viscosity of the fluid was also lower, indicating that the drilling fluid of this invention offers a faster drilling fluid. The present inventors also contemplate that, alternatively, a drilling fluid of similar derived viscosity to that prepared using the commercial PAO could be prepared by using a lower synthetic hydrocarbon to water ratio, thus offering a more economical drilling fluid.

Furthermore, the synthetic hydrocarbons of the present invention can be prepared in a variety of ways, such as blending commercially available compounds or isomerizing olefins as discussed above. Thus, these products offer considerable flexibility in choice of feedstock. Important properties of the synthetic hydrocarbon product that affect the final properties of the drilling fluid, such as kinematic viscosity and degree of branching, are controllable in this invention to an extent unavailable in practice to users of synthetic PAO's.

Additionally, since synthetic PAO's are in short supply, they are not always readily available. In part, this is because only a small fraction of the product resulting from oligomerization of, for example, 1-decene is useful in drilling fluids. In contrast, the compositions of this invention can be prepared from a variety of feeds. These feeds, such as tetradecene, hexadecene, and octadecene are commercially available products.

EXAMPLES

The invention will be further described by the following examples. These examples are not intended to be limiting, in any way, the invention being defined solely by the appended claims.

In some of the following examples, reference is made to the degree of branching in the olefin product stream after passage over the isomerization catalyst. Information on the degree of branching was obtained by hydrogenating the olefin product mixture to paraffins using a carbon-supported nickel catalyst at 210° C. and 1000 psi of hydrogen. The mixture of linear and branched paraffins was then analyzed by gas chromatography (GC) using a HP Ultra-1 boiling point column. The linear paraffin was assumed to have originated from linear olefins and the other paraffins from branched olefins. GC analysis indicated that most of the branched compounds were methyl alkanes. The position of this methyl group on the main chain appeared random. The percent alpha-olefin present was obtained by $^{13}$C NMR.

Standard procedures were used to measure drilling fluid properties. Kinematic viscosity was measured by ASTM Method D 445-4.

The standard ASTM test for pour point was found to be unsatisfactory for the olefin mixtures of this invention. Because of the variety of structures and carbon numbers in many of these mixtures, non-uniform results were obtained upon cooling. For example, some samples partially solidified on cooling, but nonetheless gave low pour point values as measured by the ASTM method. Therefore, pour points were assessed using the following procedure. A sample was placed in a bath at −10° C. for at least two days. Samples that froze, precipitated solids, gelled, or turned turbid or hazy were judged to have pour points above −10° C. For these samples, cloud points were used in place of pour points. Cloud points were determined using ASTM method D 2500-88. Samples that could be poured and preferably were also transparent were deemed to be safe for use at temperatures of −10° C.

Example 1

Alpha-Olefin Isomerization

A mixture containing equal weights of commercially available 1-tetradecene, 1-hexadecene, and 1-octadecene from Chevron Chemical Company, Houston, Tex., was passed over a Pt-SAPO catalyst at 180° C. and a WHSV of 1.0. The catalyst was prepared in a manner similar to Example 1 of U.S. Pat. No. 5,082,956. The product mixture contained less than 5% alpha-olefin and about 24 wt % of the product mixture was branched. At 100° C., the product had a viscosity of 1.4 cSt, and its pour point was below −10° C. The skeletal composition of the product is shown in Table I.

TABLE I

| carbon # | % linear | % methyl branch | % other branch | % total branched |
| --- | --- | --- | --- | --- |
| C14 | 77 | 20 | 3 | 23 |
| C16 | 76 | 21 | 3 | 24 |
| C18 | 75 | 22 | 3 | 25 |

Example 2

Alpha-Olefin Isomerization

A mixture of commercially available alpha-olefins was prepared. It contained 35% 1-tetradecene, 30% 1-hexadecene, 27% 1-octadecene, 4% 1-eicocene, 3% 1-dococene, and 1% 1-tetracocene. The mixture was passed over the catalyst of Example 1 at 180° C. and WHSV=0.58. The product mixture contained less than 5% alpha-olefin by $^{13}$C NMR, and about 35 wt % of the total product mixture was branched. At 100° C., the product had a viscosity of 1.6 cSt, and its pour point was below −10° C.

Example 3

Alpha-Olefin Isomerization

The procedure of Example 1 was repeated at 200° C. and a WHSV of 2.6. The product mixture contained less than 20% alpha-olefin by $^{13}$C NMR analysis, and about 25 wt % of the total product mixture was branched. Data on the degree of branching are shown in Table II. At 100° C., the product had a viscosity of less than 1.7 cSt, and its pour point was below −10° C.

TABLE II

| carbon # | % linear | % methyl branch | % other branch | % total branched |
| --- | --- | --- | --- | --- |
| C14 | 76 | 20 | 4 | 24 |
| C16 | 74 | 22 | 4 | 26 |
| C18 | 74 | 23 | 3 | 26 |

Example 4

Linear Internal Olefins Via Isomerization

Commercially available 1-hexadecene was passed over the catalyst from Example 1 at 125° C. and a WHSV of 0.7. The product contained less than 26% 1-hexadecene by GC. The remainder of the product was a mixture of substantially linear internal hexadecenes containing less than 10% branched olefin. The pour point of the product mixture was −7° C., compared to 9° C. for 1-hexadecene. The kinematic viscosity at 100° C. was unchanged at 1.3 cSt.

Example 5

Preparation and Testing of a Drilling Fluid

The following Examples describe the preparation and testing of drilling fluids in the laboratory. The invert emulsions were prepared by mixing the other components into the base fluid using a Gifford Wood homogenizer. The ingredients were added in the order: viscosifier, lime, emulsifier, rheological modifier (if any), brine, and fluid loss additive (if any). The slurry was allowed to attain a temperature of 120° F. while mixing in the homogenizer. The slurry was then transferred to a conventional mixture and the barite added with stirring. Rheological properties of the resulting drilling fluid were determined at 120° F., initially, and after hot-rolling at the specified temperature, typically 150° F.

The product of Example 2 was formulated into a 70/30 hydrocarbon/water ratio, 12 lb/gal drilling fluid. Two compositions were prepared, with and without a fluid loss additive:

| Component | Fluid A | Fluid B |
| --- | --- | --- |
| Product from Example 2 | 2250 ml | 2250 ml |
| Organoclay Viscosifier | 32 g | 32 g |
| Lime | 43 g | 43 g |
| Emulsifier | 86 g | 86 g |
| Rheological Modifier | 11 g | 11 g |
| 30% Calcium Chloride Brine | 832 ml | 832 ml |
| Barite | 2894 g | 2894 g |
| Fluid Loss Additive | 0 g | 65 g |

The drilling fluid compositions had the following rheological properties, measured at 120° F.

| Parameter | Fluid A | Fluid B |
| --- | --- | --- |
| Fann Dial Reading @ 600 rpm | 62 | 64 |
| Fann Dial Reading @ 300 rpm | 41 | 43 |
| Fann Dial Reading @ 3 rpm | 6 | 7 |
| Plastic Viscosity, cps | 21 | 21 |
| Yield Point, lb/100 sq ft | 20 | 22 |
| 10 s gel strength, lb/100 sq ft | 8 | 7 |
| 10 m gel strength, lb/100 sq ft | 10 | 10 |

The drilling fluids were hot rolled at 150° F. for 16 hr and the rheological properties redetermined:

| Parameter | Fluid A | Fluid B |
| --- | --- | --- |
| Fann Dial Reading @ 300 rpm | 33 | 34 |
| Fann Dial Reading @ 3 rpm | 7 | 8 |
| Plastic Viscosity, cps | 20 | 22 |
| Yield Point, lb/100 sq ft | 13 | 12 |
| 10 s gel strength, lb/100 sq ft | 10 | 11 |
| 10 m gel strength, lb/100 sq ft | 13 | 17 |
| Electrical Stability @ 120° F., V | 1150 | 1130 |
| PPT Test: 250° F., Grade 2 disk, 2500 psid | | |
| Spurt Loss, ml | 0.0 | 0.0 |
| Filtrate Volume, ml | 2.3 | 1.3 |
| PPT Value, ml | 4.6 | 2.6 |
| Filter Cake, 32 nd | 2 | 2 |
| HTHP filtrate @ 200° F., 500 psi | 8.6 | 7.5 |
| Cake Thickness, HTHP, 32 nd | 2 | 2 |
| PPT Test: 350° F., Grade 2 disk, 2500 psid | | |
| Spurt Loss, ml | 1.7 | 1.0 |
| Filtrate Volume, ml | 5.7 | 2.2 |
| PPT Value, ml | 13.1 | 5.4 |
| Filter Cake, 32 nd | 2 | 2 |

These data demonstrate that a stable invert emulsion drilling fluid can be prepared using an isomerized olefin mixture of this invention as the continuous phase.

Additionally, the formulation (Fluid A) without any fluid loss additive had good filtration properties at 300° F. and 350° F. Filtration control can easily be reduced by the addition of a fluid loss additive.

Example 6

Preparation and Testing of a Drilling Fluid

The product of Example 2 was formulated into a 70/30 oil/water ratio, 12 lb/gal drilling fluid. For comparative purposes, a drilling fluid was also prepared using a state of the art synthetic hydrocarbon, Synfluid® 2 cSt. Polyalphaolefin, available from Chevron Chemical Company, Houston, Tex.

| Component | Fluid C | Fluid D |
| --- | --- | --- |
| Product from Example 2 | 2250 ml | |
| 2 cSt PAO | 0 | 2250 ml |
| Organoclay Viscosifier | 54 g | 54 g |
| Lime | 65 g | 65 g |
| Emulsifier | 130 g | 130 g |
| 30% Calcium Chloride Brine | 832 ml | 832 ml |
| Barite | 2895 g | 2895 g |
| Fluid Loss Additive | 151 g | 151 g |

The drilling fluid compositions had the following rheological properties, measured at 120° F.

| Parameter | Fluid C | Fluid D |
| --- | --- | --- |
| Fann Dial Reading @ 600 rpm | 70 | 121 |
| Fann Dial Reading @ 300 rpm | 40 | 71 |
| Fann Dial Reading @ 3 rpm | 4 | 9 |
| Plastic Viscosity, cps | 30 | 50 |
| Yield Point, lb/100 sq ft | 10 | 21 |
| 10 s gel strength, lb/100 sq ft | 5 | 9 |
| 10 m gel strength, lb/100 sq ft | 7 | 10 |

The drilling fluids were hot rolled at 300° F. for 12 hr and the rheological properties redetermined.

| Parameter | Fluid C | Fluid D |
| --- | --- | --- |
| Fann Dial Reading @ 600 rpm | 72 | 102 |
| Fann Dial Reading @ 300 rpm | 41 | 58 |
| Fann Dial Reading @ 3 rpm | 5 | 4 |
| Plastic Viscosity, cps | 31 | 44 |
| Yield Point, lb/100 sq ft | 10 | 14 |
| 10 s gel strength, lb/100 sq ft | 5 | 4 |
| 10 m gel strength, lb/100 sq ft | 9 | 9 |
| HTHP filtrate @ 400° F., 500 psi | 9 | 8 |
| Cake Thickness, HTHP, 32 nd | 3 | 2 |
| Electrical Stability @ 120° F., V | 430 | 520 |

These data show that a drilling fluid formulated with the olefin mixture has better high temperature stability than a state of the art drilling fluid formulated with 2 cSt PAO. Overall, the high temperature stability of the emulsion was excellent. Additionally, Fluid C exhibited a lower viscosity which would be advantageous by providing a faster drilling type fluid.

Example 7

Preparation and Testing of a Drilling Fluid

A mixture of equal weights of linear internal tetradecenes, hexadecenes, and octadecenes was prepared by double bond isomerization of the normal alpha olefins. The mixture had less than 10% branched olefin. The mixture was formulated into a drilling fluid with the following composition:

| | |
| --- | --- |
| $C_{14-18}$ olefin mixture | 2250 ml |
| Organoclay Viscosifier | 54 g |
| Lime | 65 g |
| Emulsifier | 130 g |
| 30% Calcium Chloride Brine | 832 ml |
| Barite | 2895 g |

The drilling fluid composition had the following rheological properties, measured at 120° F., before and after hot rolling at 150° F. for 16 hrs.

| Parameter | Initial Value | Value After Aging |
| --- | --- | --- |
| Fann Dial Reading @ 600 rpm | 50 | 59 |
| Fann Dial Reading @ 300 rpm | 28 | 35 |
| Fann Dial Reading @ 3 rpm | 3 | 5 |
| Plastic Viscosity, cps | 22 | 24 |
| Yield Point, lb/100 sq ft | 6 | 11 |
| 10 s gel strength, lb/100 sq ft | 4 | 5 |
| 10 m gel strength, lb/100 sq ft | 5 | 7 |
| Electrical Stability @ 120° F., V | 439 | 528 |

These data show that a functional drilling fluid can be formulated using linear internal olefins as the synthetic hydrocarbon continuous phase.

Example 8

Preparation and Testing of a Drilling Fluid

Commercially available 1-tetradecene (purchased from Chevron Chemical Co., Houston, Texas) was formulated into a drilling fluid with the following composition:

| | |
|---|---|
| 1-tetradecene | 2250 ml |
| Organoclay Viscosifier | 54 g |
| Lime | 65 g |
| Emulsifier | 130 g |
| 30% Calcium Chloride Brine | 832 ml |
| Barite | 2895 g |

The drilling fluid composition had the following rheological properties, measured at 120° F., before and after hot rolling at 150° F. for 16 hrs.

| Parameter | Initial Value | Value After Aging |
|---|---|---|
| Fann Dial Reading @ 600 rpm | 31 | 34 |
| Fann Dial Reading @ 300 rpm | 16 | 19 |
| Fann Dial Reading @ 3 rpm | 1 | 1 |
| Plastic Viscosity, cps | 15 | 15 |
| Yield Point, lb/100 sq ft | 6 | 4 |
| 10 s gel strength, lb/100 sq ft | 2 | 3 |
| 10 m gel strength, lb/100 sq ft | 3 | 3 |
| Electrical Stability @ 120° F., V | 368 | 302 |

These data show that a functional drilling fluid can be formulated with 1-tetradecene as the synthetic hydrocarbon continuous phase.

Example 9

Preparation and Testing of a Drilling Fluid

A linear internal octadecene mixture containing less than 10% branched product was formulated into a drilling fluid with the following composition:

| | |
|---|---|
| Linear Octadecenes | 2250 ml |
| Organoclay Viscosifier | 54 g |
| Lime | 65 g |
| Emulsifier | 130 g |
| 30% Calcium Chloride Brine | 832 ml |
| Barite | 2895 g |

The drilling fluid, composition had the following rheological properties, measured at 120° F., before and after hot rolling at 150° F. for 16 hr.

| Parameter | Initial Value | Value After Aging |
|---|---|---|
| Fann Dial Reading @ 600 rpm | 67 | 69 |
| Fann Dial Reading @ 300 rpm | 40 | 41 |
| Fann Dial Reading @ 3 rpm | 8 | 8 |
| Plastic Viscosity, cps | 27 | 28 |
| Yield Point, lb/100 sq ft | 13 | 13 |
| 10 s gel strength, lb/100 sq ft | 8 | 8 |
| 10 m gel strength, lb/100 sq ft | 11 | 9 |
| Electrical Stability @ 120° F., V | 739 | 771 |

Example 10

Toxicity Testing

The acute toxicity of the drilling fluids towards 4–6 day old mysid shrimp (Mysidopsis bahia) was determined. Statistical analysis of the test results and calculation of a 96 hr $LC_{50}$ were performed using procedures recommended and approved by the US EPA. The $LC_{50}$ is the concentration of a test sample that produces 50% mortality in the test organisms and can be used as a measure of that sample's acute toxicity. Samples having an $LC_{50}$ of greater than 30,000 ppm is defined as a pass, i.e., these samples have minimal toxicity.

The bioassays were conducted using the suspended particulate phase (SPP) of the drilling fluid following the United States Environmental Protection Agency protocol in Appendix 3 of "Effluent Limitation Guidelines and New Source Performance Standards: Drilling Fluids Toxicity Test," Federal Register Vol. 50, No. 165, 34631–34636. The SPP is the unfiltered supernatant extracted from a stirred 1:9 mixture of the drilling fluid and sea water which has been allowed to settle 1 hr.

Initially, a 48 hr range finder test was performed with ten mysid shrimp being added to each of five concentrations (3%, 10%, 25%, 50%, and 100% SPP) and a sea water control, without replication. Based on the results of the range-finding test, the definitive 96 hr bioassay was initiated with test solutions of 3%, 10%, 25%, 50%, and 100% SPP for the sample. Twenty mysids were added to each of the five concentrations of the test solution (SPP) and to the sea water control. Three replicates were used. Water quality parameters were measured and observations of test animals were made at 24 hr intervals. After 96 hr, the test was terminated.

The drilling fluid from Example 9 had a $LC_{50}$ of greater than 1,000,000 ppm. These data demonstrate that these mostly linear olefin mixtures are minimally toxic when used as the continuous phase for a synthetic hydrocarbon-based drilling fluid.

What is claimed is:

1. An invert emulsion drilling fluid comprising:
   (a) a continuous phase, comprising a mixture of mostly linear olefins containing 50 to 100% linear olefins and less than 20% alpha olefins, wherein the olefins contain at least 12 carbon atoms:
   (b) a weight material; and
   (c) water.

2. The drilling fluid of claim 1 containing up to 70% water by volume.

3. The drilling fluid of claim 1 further comprising one or more additives, at least one of which is selected from the group consisting of emulsifiers, wetting agents, viscosifiers, densifiers, and fluid-loss preventatives.

4. The drilling fluid of claim 1 wherein the kinematic viscosity of the olefin mixture is between 1 and 3 cSt when measured at 100° C. and the pour point is below 0° C.

5. The drilling fluid of claim 4 wherein the kinematic viscosity of the olefin mixture is between 1.3 and 1.7 cSt when measured at 100° C. and the pour point is below −5° C.

6. The drilling fluid of claim 1 wherein the olefin mixture comprises olefins having between 12 and 24 carbon atoms.

7. The drilling fluid of claim 6 wherein the olefin mixture comprises olefins having between 14 and 18 carbon atoms.

8. The drilling fluid of claim 7 wherein the olefin mixture comprises olefins having 14 carbon atoms.

9. The drilling fluid of claim 7 wherein the kinematic viscosity of the olefin mixture is between 1.3 and 1.7 cSt when measured at 100° C. and the pour point is below −9° C.

10. The drilling fluid of claim 1 further blended with a branched hydrocarbon.

11. The drilling fluid of claim 10 wherein the branched hydrocarbon is a polyalphaolefin.

12. The drilling fluid of claim 1 wherein the olefin mixture is prepared by partially isomerizing a feed containing one or more linear olefins containing between 12 and 24 carbon atoms.

13. The drilling fluid of claim 12 wherein the feed olefins contain between 14 and 18 carbon atoms.

14. The drilling fluid of claim 12 wherein the feed olefins contain alpha olefins.

15. The drilling fluid of claim 1 wherein the olefin mixture exhibits a flash point above 90° C.

16. The drilling fluid of claim 15 wherein the olefin mixture exhibits a flash point above 110° C.

17. The drilling fluid of claim 1 wherein the olefin mixture contains 60 to 100% linear olefins.

18. The drilling fluid of claim 16 wherein the olefin mixture contains 70 to 80% linear olefins.

* * * * *